(12) United States Patent
Chin et al.

(10) Patent No.: US 8,208,249 B2
(45) Date of Patent: Jun. 26, 2012

(54) PORTABLE INFORMATION TERMINAL

(75) Inventors: Byung-wook Chin, Changwon (KR); Eun-kyung Lee, Changwon (KR); So-hyun Ahn, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 12/321,635

(22) Filed: Jan. 23, 2009

(65) Prior Publication Data

US 2009/0190295 A1 Jul. 30, 2009

(30) Foreign Application Priority Data

Jan. 30, 2008 (KR) ........................ 10-2008-0009680

(51) Int. Cl.
*G06F 1/16* (2006.01)
*H05K 5/00* (2006.01)
*H05K 7/00* (2006.01)

(52) U.S. Cl. ............ 361/679.27; 361/679.55; 455/575.3

(58) Field of Classification Search ............. 361/679.27, 361/679.58; 455/575.1–575.4
See application file for complete search history.

(56) References Cited

U.S. PATENT DOCUMENTS

| | | | | |
|---|---|---|---|---|
| 4,825,395 A * | 4/1989 | Kinser et al. | ............. | 361/679.09 |
| 5,175,672 A * | 12/1992 | Conner et al. | ............. | 361/679.09 |
| 5,243,549 A * | 9/1993 | Oshiba | ............. | 361/679.09 |
| 5,251,102 A * | 10/1993 | Kimble | ............. | 361/679.09 |
| 5,416,730 A * | 5/1995 | Lookofsky | ............. | 361/679.09 |
| D359,275 S * | 6/1995 | Yamazaki | ............. | D14/318 |
| 5,477,129 A * | 12/1995 | Myslinski | ............. | 340/636.1 |
| 5,481,645 A * | 1/1996 | Bertino et al. | ............. | 704/270 |
| 5,583,744 A * | 12/1996 | Oguchi et al. | ............. | 361/679.58 |
| 5,594,617 A * | 1/1997 | Foster et al. | ............. | 361/679.02 |
| 5,768,164 A * | 6/1998 | Hollon, Jr. | ............. | 708/174 |
| 5,841,630 A * | 11/1998 | Seto et al. | ............. | 361/679.58 |
| 5,898,600 A * | 4/1999 | Isashi | ............. | 708/105 |
| 5,926,364 A * | 7/1999 | Karidis | ............. | 361/679.27 |
| 6,073,187 A * | 6/2000 | Jacobs et al. | ............. | 710/14 |
| 6,078,496 A * | 6/2000 | Oguchi et al. | ............. | 361/679.55 |
| 6,116,767 A * | 9/2000 | Chaiken et al. | ............. | 710/15 |
| 6,154,359 A * | 11/2000 | Kamikakai et al. | ............. | 361/679.27 |
| 6,307,740 B1 * | 10/2001 | Foster et al. | ............. | 361/679.1 |
| 6,341,061 B1 * | 1/2002 | Eisbach et al. | ............. | 361/679.46 |
| 6,353,529 B1 * | 3/2002 | Cies | ............. | 361/679.05 |
| 6,392,871 B1 * | 5/2002 | Yanase | ............. | 361/679.07 |
| 6,392,877 B1 * | 5/2002 | Iredale | ............. | 361/679.05 |
| 6,430,038 B1 * | 8/2002 | Helot et al. | ............. | 361/679.05 |
| 6,456,488 B1 * | 9/2002 | Foster et al. | ............. | 361/679.1 |
| 6,480,373 B1 * | 11/2002 | Landry et al. | ............. | 361/679.06 |
| 6,480,374 B1 * | 11/2002 | Lee | ............. | 361/679.17 |
| 6,492,974 B1 * | 12/2002 | Nobuchi et al. | ............. | 345/156 |
| 6,558,057 B2 * | 5/2003 | Lin | ............. | 400/691 |
| 6,612,668 B2 * | 9/2003 | Doan | ............. | 312/223.2 |

(Continued)

*Primary Examiner* — Jinhee Lee
*Assistant Examiner* — Adrian S Wilson
(74) *Attorney, Agent, or Firm* — Drinker Biddle & Reath LLP

(57) ABSTRACT

A portable information terminal is provided which includes: a first panel with a first flat board unit including a first accommodating unit and a first hinge unit; a connecting unit including a button unit on one or more surfaces thereof, a first portion of the connecting unit configure to be accommodated in the first accommodating unit so as to be rotatably connected to the first hinge unit; and a second panel which includes a second flat board unit with a second accommodating unit for accommodating a second portion of the connecting unit, and a second hinge unit configured to be rotatably connected to another side of the connecting unit.

20 Claims, 11 Drawing Sheets

U.S. PATENT DOCUMENTS

| | | | | |
|---|---|---|---|---|
| 6,628,506 B2 * | 9/2003 | Landry et al. | | 361/679.27 |
| 6,643,124 B1 * | 11/2003 | Wilk | | 361/679.04 |
| 6,654,234 B2 * | 11/2003 | Landry et al. | | 361/679.27 |
| 6,687,119 B2 * | 2/2004 | Lai et al. | | 361/679.09 |
| 6,700,773 B1 * | 3/2004 | Adriaansen et al. | | 361/679.08 |
| 6,707,666 B1 * | 3/2004 | Chuang | | 361/679.05 |
| 6,744,623 B2 * | 6/2004 | Numano et al. | | 361/679.27 |
| 6,791,597 B2 * | 9/2004 | Ando et al. | | 348/14.02 |
| 6,792,480 B2 * | 9/2004 | Chaiken et al. | | 710/14 |
| 6,816,365 B2 * | 11/2004 | Hill et al. | | 361/679.44 |
| 6,819,961 B2 * | 11/2004 | Jacobs et al. | | 700/17 |
| 6,825,415 B1 * | 11/2004 | Chen et al. | | 174/63 |
| 6,831,229 B1 * | 12/2004 | Maatta et al. | | 174/66 |
| 6,862,171 B1 * | 3/2005 | Maskatia et al. | | 361/679.06 |
| 6,873,521 B2 * | 3/2005 | Landry et al. | | 361/679.06 |
| 6,882,529 B2 * | 4/2005 | Helot et al. | | 361/679.27 |
| 6,900,981 B2 * | 5/2005 | Kuivas et al. | | 361/679.06 |
| 6,903,927 B2 * | 6/2005 | Anlauff | | 361/679.28 |
| 6,912,121 B2 * | 6/2005 | Karidis et al. | | 361/679.06 |
| 6,930,881 B2 * | 8/2005 | Karidis et al. | | 361/679.55 |
| 6,947,279 B2 * | 9/2005 | Cheng et al. | | 361/679.06 |
| 6,980,420 B2 * | 12/2005 | Maskatia et al. | | 361/679.57 |
| 6,980,423 B2 * | 12/2005 | Tanaka et al. | | 361/679.06 |
| 7,016,183 B2 * | 3/2006 | Takemoto et al. | | 361/679.07 |
| 7,061,472 B1 * | 6/2006 | Schweizer et al. | | 345/168 |
| 7,104,516 B2 * | 9/2006 | Uto et al. | | 248/688 |
| 7,106,579 B2 * | 9/2006 | Maskatia et al. | | 361/679.28 |
| 7,113,397 B2 * | 9/2006 | Lee | | 361/679.06 |
| 7,155,266 B2 * | 12/2006 | Stefansen | | 455/575.3 |
| 7,196,901 B2 * | 3/2007 | Maskatia et al. | | 361/679.55 |
| 7,255,317 B2 * | 8/2007 | Huang et al. | | 248/371 |
| 7,328,481 B2 * | 2/2008 | Barnett | | 16/227 |
| 7,345,872 B2 * | 3/2008 | Wang | | 361/679.55 |
| 7,352,565 B2 * | 4/2008 | Yin | | 361/679.55 |
| 7,353,050 B2 * | 4/2008 | Im et al. | | 455/575.3 |
| 7,419,099 B2 * | 9/2008 | Lee et al. | | 235/472.01 |
| 7,450,978 B2 * | 11/2008 | Park | | 455/575.3 |
| 7,489,503 B2 * | 2/2009 | Maatta | | 361/679.27 |
| 7,492,891 B2 * | 2/2009 | Eldon | | 379/433.12 |
| 7,570,482 B2 * | 8/2009 | Chan | | 361/679.21 |
| 7,630,193 B2 * | 12/2009 | Ledbetter et al. | | 361/679.21 |
| 7,667,959 B2 * | 2/2010 | Pelkonen | | 361/679.27 |
| 7,787,914 B2 * | 8/2010 | Ahn et al. | | 455/575.3 |
| 7,930,803 B2 * | 4/2011 | Ueyama et al. | | 16/366 |
| 7,934,689 B2 * | 5/2011 | Chiu et al. | | 248/222.11 |
| 8,106,887 B2 * | 1/2012 | Park et al. | | 345/169 |
| 2003/0142469 A1 * | 7/2003 | Ponx | | 361/683 |
| 2003/0221876 A1 * | 12/2003 | Doczy et al. | | 178/18.01 |
| 2004/0114319 A1 * | 6/2004 | Hill et al. | | 361/683 |
| 2005/0052833 A1 * | 3/2005 | Tanaka et al. | | 361/681 |
| 2005/0099533 A1 * | 5/2005 | Matsuda et al. | | 348/375 |
| 2005/0124394 A1 * | 6/2005 | Kim et al. | | 455/575.3 |
| 2005/0186985 A1 * | 8/2005 | Im et al. | | 455/550.1 |
| 2005/0239520 A1 * | 10/2005 | Stefansen | | 455/575.1 |
| 2006/0126284 A1 * | 6/2006 | Moscovitch | | 361/681 |
| 2006/0146488 A1 * | 7/2006 | Kimmel | | 361/681 |
| 2006/0238968 A1 * | 10/2006 | Maatta et al. | | 361/683 |
| 2006/0264243 A1 * | 11/2006 | Aarras | | 455/566 |
| 2007/0217135 A1 * | 9/2007 | Chuang et al. | | 361/681 |
| 2008/0169351 A1 * | 7/2008 | Whiting | | 235/493 |

* cited by examiner

PORTABLE INFORMATION TERMINAL

CROSS-REFERENCE TO RELATED PATENT APPLICATION

This application claims the benefit of Korean Patent Application No. 10-2008-0009680, filed on Jan. 30, 2008, in the Korean Intellectual Property Office, the disclosure of which is incorporated herein in its entirety by reference.

BACKGROUND

1. Field of the Invention

The present invention relates generally to a portable electronic device. More particularly the present invention relates to a portable information terminal with two panels that are each hingably coupled with a connecting unit for moving the panels between first and second folded states. Buttons on the connecting unit are exposed in either of the folded states so the terminal may be operated even when the panels in a folded state.

2. Description of the Related Art

Portable information terminals such as, for example cellular phones, portable multimedia players (PMPs), personal digital terminals (PDAs), notebook computers, tablet personal computers (PCs), and the like are designed to be able to perform various functions in an all-in-one type module, and are designed in various forms in order to maximize convenience of carrying and operating the terminals.

The portable information terminals have various functions such as a music reproducing function (e.g., an mp3 file playback function), a movie reproducing function, a TV viewing function using terrestrial digital multimedia broadcasting (DMB) or satellite DMB, a digital camera function, an internet browser function, an e-commerce function, a file working function, an electronic organizer function for managing personal and business contact information, and the like.

It is highly preferred for portable information terminals to be small and thin for convenience of carrying. Furthermore, it is preferred that such portable information terminals provide a convenient user interface so as to enable the proper use of the above functions in a single portable information terminal.

The portable information terminal is configured with a display apparatus such as a liquid crystal display (LCD) so as to output images or text. There are various methods of installing the display apparatus in the portable information terminal, and generally, a hinge coupling is used to maximize the display area. For example, with portable information terminals embodied as flip-type phones and laptop computers the hinge coupling may rotatably couple a first panel having a display apparatus with a second panel having an operating unit such as a keyboard, keypad, etc. However, the hinge coupling of a conventional portable information terminal has a problem in that a rotation angle of the display apparatus is limited. That is, the display apparatus may only hingably rotate or pivot about an angle of approximately 180 degrees (or less) relative to the second panel.

Also, if the portable information terminal is operated in a folded state so as not to externally expose the display apparatus, buttons disposed on a lateral surface of the display apparatus (or the second panel) are not externally exposed, and thus, are inaccessible which makes it difficult to operate the portable information terminal.

When a music file or a movie file is reproduced using the portable information terminal or when photographing is performed using a camera, sometimes it is convenient to vertically stand and support the portable information terminal on a flat surface, such as on a desk, by operating the portable information terminal in a folded state. However, in order to stand the conventional portable information terminal in a folded state, a separate stand or rest (e.g., a tripod, docking station, etc.) is required.

When a function for displaying files such as a web page including images and text is used in the portable information terminal, both the images and the text are displayed on one small screen in the case of a portable information terminal having a small display apparatus, and therefore a user may have difficulty viewing a file on the screen.

When a user performs a self-photographing function in which the user photographs him or herself by using a camera, it is desirable for the user to be able to view him or herself by using a display apparatus. Conventional portable cameras have been manufactured using various methods of installing a display apparatus, which is rotatable, in the body of the cameras, in order to embody the above function. However, it is difficult and complex to design the portable information terminal having the above structure.

SUMMARY

According to an aspect of the present invention, there is provided a portable information terminal including a first panel, a second panel and a connecting unit having a button unit. The first and second panels are rotatably connected to the connecting unit for movement between first and second folded orientations or states.

The first panel may include a first flat board unit having a first accommodating unit that is formed by removing a part of an edge of the first flat board unit, and a first hinge unit that is formed on a lateral surface of the first accommodating unit. The connecting unit may include a button unit on one or more surfaces thereof, and a portion of the connecting unit that is accommodated in the first accommodating unit is configured to be rotatably connected to the first hinge unit. The second panel may include a second flat board unit having a second accommodating unit that is formed by removing a part of an edge of the second flat board unit so as to accommodate another portion of the connecting unit, and a second hinge unit that is formed on a lateral surface of the second accommodating unit so as to be rotatably connected to another side of the connecting unit.

The first and second panels may be rotatable with respect to the connecting unit such that the first and second panels move between first and second (folded) positions. In the first position, a first surface of the first flat board unit and a first surface of the second flat board unit face each other. In the second position, second surfaces of the first and second flat board units (i.e., the second surfaces being opposite the first surfaces) face each other.

An embodiment of the connecting unit is a hexahedron having parallel end surfaces and a quadrangle-shaped cross section. The connecting unit may include: a first face which is configured to contact an object surface when the first and second panels are in the first position so that the portable information terminal can stand on the object surface; and a second face which is an opposite surface to the first surface and which is configured to contact the object surface when the first and second panels are in the second position so that the portable information terminal can stand on the object surface.

The second face may make an acute angle with respect to the first face and vice versa.

The portable information terminal may include a first button unit on the second face of the connecting unit which may be used to input text.

When the first and second panels are in the first position, the first hinge unit may extend downward from a first surface of the first flat board unit, and the second hinge unit may extend downward from a first surface of the second flat board unit, so that the first hinge unit and the second hinge unit face with each other.

When the first and second panels rotate with respect to the connecting unit so that the second surfaces of the first and second flat board units contact the object surface, the second surface of the first hinge unit, the second surface of the second hinge unit, and the second face of the connecting unit may be coplanar.

The connecting unit may include a second button unit on a third face that is configured to be exposed to the outside through the second accommodating unit when the first and second panels are in the first position or in the second position.

The portable information terminal may further include one or more of the following: a digital camera on the first surface of the first flat board unit; a first display unit on the second surface of the second flat board unit; and an audio output unit for outputting an audio signal.

The portable information terminal may include a sensor unit which detects whether the first and second panels are in the first position or in the second position, and the second button unit includes camera operating buttons used to operate the digital camera and multimedia operating buttons used to operate a multimedia player, so that when the first and second panels are in the first position, the first button unit may activate the camera operating buttons, and when the first and second panels are in the second position, the first button unit may activate the multimedia operating buttons.

The portable information terminal may further include a second display unit on the first surface of the first flat board unit, wherein the first display unit may display a web page, and the second display unit may display text information of the web page.

The portable information terminal may further include a second display unit on the first surface of the first flat board unit, and when a photographing mode of the camera is a self-photographing mode, images obtained by the camera may be displayed on the second display unit.

The connecting unit may further include a third button unit on a fourth face exposed to the outside through the first accommodating unit, when the first and second panels are in the first position or in the second position.

The portable information terminal may further include a first display unit and a receiving unit which are on the first surface of the first flat board unit, a key pad unit and a sending unit which are on the first surface of the second flat board unit, and a camera and a second display unit which are on the other surface of the first flat board unit.

DETAILED DESCRIPTION OF THE EMBODIMENTS

Now, exemplary embodiments according to the present invention will be described in detail with reference to the accompanying drawings.

Figure 1:
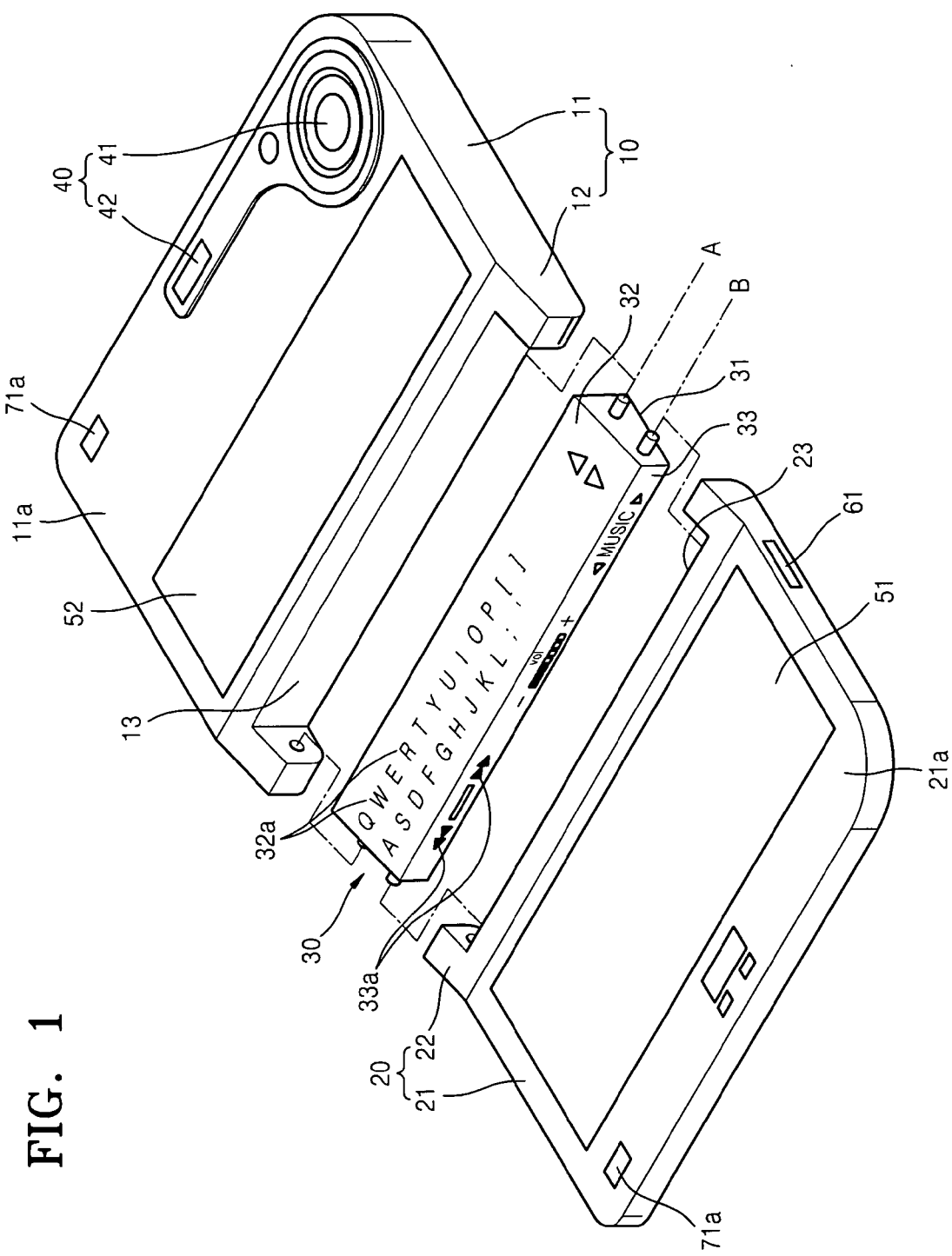
FIG. 1 is a partially exploded perspective view of a portable information terminal according to an embodiment of the present invention.

FIG. 1 is a partially exploded perspective view of a portable information terminal according to an embodiment of the present invention.

Referring to FIG. 1, the portable information terminal according to an embodiment of the present invention includes a first panel 10, a second panel 20, and a connecting unit 30 connecting the first panel 10 and the second panel 20. The first panel 10 and the second panel 20 are rotatably/hingably connected to the connecting unit 30, respectively. An angle defined between the first panel 10 and the second panel 20 varies according to movement of one or both of the panels 10, 20 with respect to the connecting unit 30 so that the portable information terminal may be operated in various orientations or configurations.

The first panel 10 includes a first flat board unit 11 and a first hinge unit 12. The second panel 20 includes a second flat board unit 21 and a second hinge unit 22. The first flat board unit 11 and the second flat board unit 21 are main parts of the portable information terminal and include various electronic components. The first flat board unit 11 includes an inner edge 13 which, along with the projections that constitute the first hinge unit 12, define a first accommodating unit. That is, the connecting unit 30 is configured to be accommodated in the first accommodating unit between the projections defining the first hinge unit 12. The first accommodating unit and the first hinge unit 12 may be formed by removing a middle part of an inner side portion of the first flat board unit 11 so that the first hinge unit 12 comprises two spaced-apart projections that extend inwardly (i.e., toward the connecting unit 30) from the inner edge 13. The second flat board unit 21 includes an inner edge 23 which, along with the projections that constitute the second hinge unit 22, define a second accommodating unit. That is, the connecting unit 30 is configured to be accommodated in the second accommodating unit between the projections defining the second hinge unit 22. Similar to the first accommodating unit and first hinge unit 12, the second accommodating unit and the second hinge unit 22 may be formed by removing a middle part of an inner side portion of the second flat board unit 12 so that the second hinge unit 22 comprises two spaced-apart projections that extend inwardly (i.e., toward the connecting unit 30) from the inner edge 23.

The connecting unit 30 extends in a lengthwise direction of the first panel 10 and the second panel 20. A portion of the connecting unit 30 is accommodated in the first accommodating unit along first edge 13 of first flat board unit 11, and the other portion of the connecting unit 30 is accommodated in the second accommodating unit along second edge 23 of the second flat board unit 21. A portion of the connecting unit 30 is rotatably connected to the first hinge unit 12, and the other portion of the connecting unit 30 is rotatably connected to the second hinge unit 22. The connecting unit 30 includes a first and second set of pivot bosses that extend outwardly from parallel end surfaces. The first set of pivot bosses are configured for insertion into pivot holes defined in the first hinge unit 12, and the second set of pivot bosses are configured for insertion into pivot holes defined in the second hinge unit 22. The first set of pivot bosses define a first pivot axis "A" that extends through the pivot bosses of the first set, and the second set of pivot bosses define a second pivot axis "B" that extends through the pivot bosses of the second set. The pivot axis "A" is spaced apart from and parallel to the pivot axis "B" as shown in FIG. 1. The first flat board unit 11 is configured to rotate or pivot about pivot axis "A" while the second flat board unit 21 is configured to rotate or pivot about pivot axis "B."

A digital camera 40 is configured on a first generally planar surface 11a of the first flat board unit 11. The digital camera 40 as shown includes a lens 41 and a flash 42.

A first display unit 51 is configured on a first generally planar surface 21a of the second flat board unit 21, and a second display unit 52 is configured on the first generally planar surface 11a of the first flat board unit 11. The first display unit 51 may be a display apparatus such as a color liquid crystal display (LCD) apparatus and the like for displaying web pages, text, or images.

The second display unit 52 may cooperate with the camera 40 for facilitating a preview function in which images are displayed before the images are captured by the digital camera 40, particularly when a user uses a self-photographing function in which the user photographs him or herself by using the digital camera 40. Also, the second display unit 52 may perform a function for displaying only text displayed on the first display unit 51, when the first display unit 51 displays files including images and text, such as in the case of a web page. Thus, a black-and-white LCD may be used as the second display unit 52. However, the present invention is not limited to the illustrated configuration of display apparatuses (i.e., the first display unit 51 and the second display unit 52). Furthermore, the display apparatuses are not limited to LCD apparatuses, and an organic light-emitting diode (OLED) can also be used as the first display unit 51 and the second display unit 52.

The portable information terminal may further include an audio output unit which outputs audio signals. The audio output unit may be connected to the first panel 10, the second panel 20, or the connecting unit 30, and may be embodied in various ways, such as by using a speaker or an audio output terminal (e.g., a headphone or speaker jack). In FIG. 1, a speaker 61 which is on a lateral surface of the second panel 20 is illustrated as the audio output unit.

The connecting unit 30 is parallelepiped-shaped. More particularly, the connecting unit 30 is hexahedral, specifically a frusto-triangular prism with a quadrangle-shaped cross section. The connecting unit 30 includes a button unit on at least one surface (i.e., not the two parallel end surfaces from which the pivot bosses extend) of the connecting unit 30. A user can operate electronic apparatuses of the first panel 10 or the second panel 20, such as the first and second display units 51 and 52 or the digital camera 40, by using the button unit (i.e., pressing a button or buttons thereof). Accordingly, the first panel 10, the second panel 20, and the connecting unit 30 may be electrically connected to one another through the first hinge unit 12 and the second hinge unit 22. The first hinge unit 12 and the second hinge unit 22 may include a flexible cable or electric terminals (e.g., slip rings) which can electrically connect the first panel 10, the second panel 20, and the connecting unit 30 to one another.

Since the connecting unit 30 has a quadrangle-shaped cross section (when cut by a plane cross to pivot axes A and/or B), the connecting unit 30 has four faces (except for the two lateral/end faces that are rotatably coupled to the first hinge unit 12 and the second hinge unit 22) on which the button unit(s) may be configured. FIG. 1 illustrates a first face 31, a second face 32 which is an opposite surface of the first face 31, and a third face 33. A fourth face 34 (not shown in FIG. 1, but shown in FIGS. 4, 5 and 7) is an opposite surface of the third face 33. As can be appreciated from FIGS. 1 and 8, the third face 33 is generally configured to have a substantially similar surface area as edge 23, and the fourth face 34 is generally configured to have a substantially similar surface area as edge 13. As can be further appreciated from FIG. 4, faces 31 and 32 may have substantially similar surface areas such that the quadrangle cross sectional shape of the connection unit 30 is a frusto-isosceles triangle. In FIG. 1, a first button unit 32a on the second face 32 and a second button unit 33a on the third face 33 are illustrated as examples of the button unit. However the connection unit 30 may be configured differently, for example with fewer or additional button units, or with the button units configured on different faces (e.g., vice versa or with the first button unit 32a on the first face 31, a second button unit 33a on the second face 32, a third button unit 34a on the third face 33, and a fourth button unit 31a on the fourth face 34). Indeed, the connection unit 30 may be configured with various button unit or units.

The portable information terminal may include a sensor unit 71 for detecting positions of the first panel 10 and the second panel 20. The sensor unit includes two first sensor units 71a as shown, however fewer or additional first sensor unit 71a may be provided. As shown in FIG. 1, one of the first sensor units 71a is configured on a first surface 11a of the first flat board unit 11, whereas the other one of the first sensor units 71a is configured on a first surface 21a of the second flat board unit 21 such that the two first sensor units 71a generally overlap when the portable information terminal is folded closed with the first surfaces 11a and 21a facing each other. Accordingly, the sensor unit 71 can detect whether the first surface 11a of the first flat board unit 11 and the first surface 21a of the second flat board unit 21 face each other or not. Although not shown, portable information terminal may further include a second sensor unit 71b (FIGS. 2 and 3) that is configured on the second surfaces of the first and second flat board units 11, 21 that are opposite to the first surfaces 11a and 21a. The second sensor unit can detect whether the second surface of the first flat board unit 11 and the second surface of the second flat board unit 21 face each other or not. That is, the second sensor unit may facilitate determination of instances when the portable information terminal is in a second folded closed state or orientation with the first surfaces 11a and 21a facing outwardly and opposite to each other. First and second sensor units may be various sensors known in the art such as proximity sensors (e.g., infrared or optical sensors), magnetic sensors (e.g., reed switches), and the like.

Figure 2:
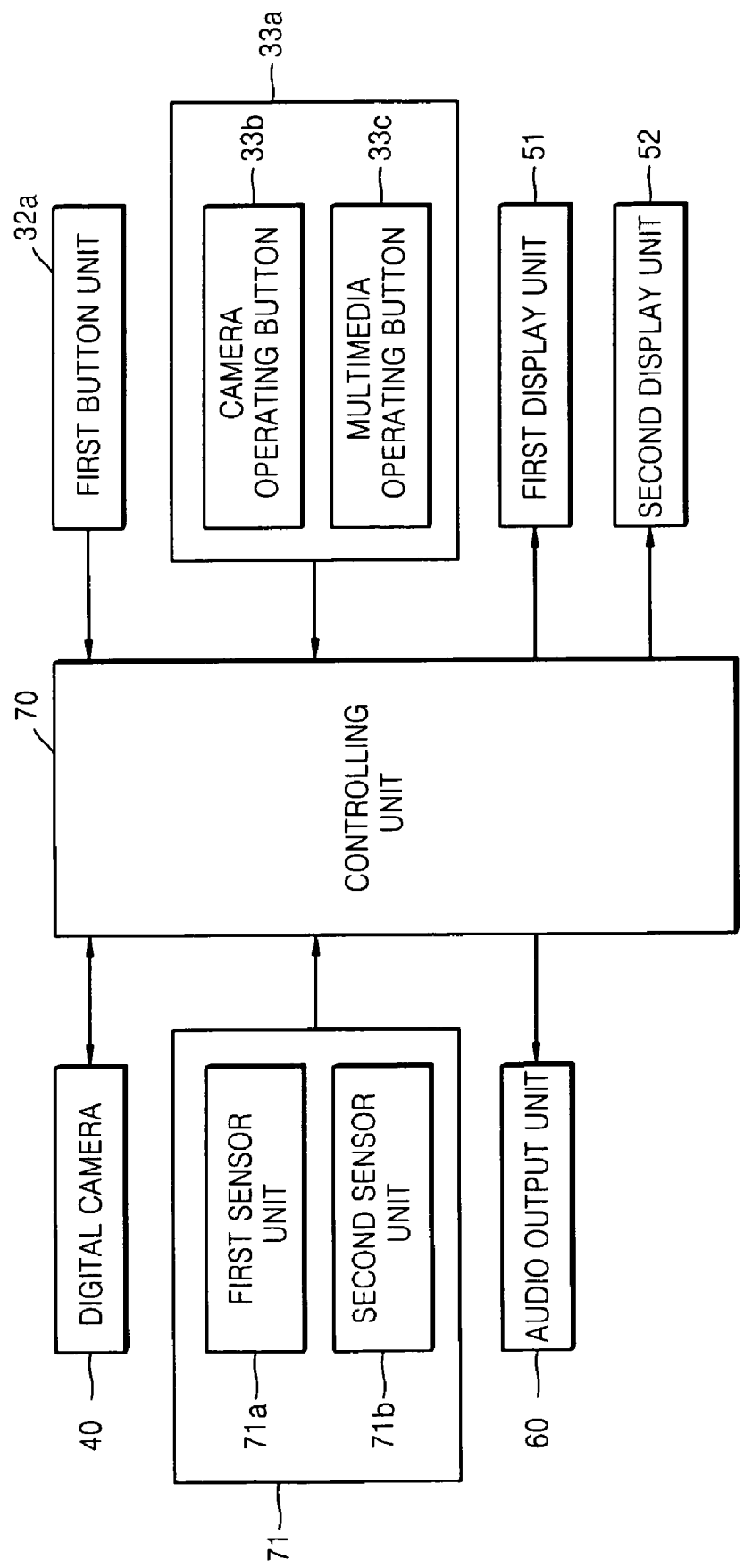
FIG. 2 is a block diagram illustrating an example configuration of components of the portable information terminal of FIG. 1.

FIG. 2 is a block diagram of an example configuration of the portable information terminal of FIG. 1.

The portable information terminal may include a controlling unit 70 for controlling various electronic apparatuses by sending and receiving electric controlling signals. The controlling unit 70 may be embodied as a semiconductor chip (not shown) including controlling software, or a circuit board including the semiconductor chip. The controlling unit 70 may be installed inside one or more of the first panel 10, the second panel 20, and the connecting unit 30, and the place where the controlling unit 70 is installed may vary.

The controlling unit 70 is electrically connected to a first button unit 32a and a second button unit 33a, so that the controlling unit 70 receives signals by a user manipulating the buttons. As shown, the second button unit 33a includes a camera operating button 33b and a multimedia operating button 33c so that the user can operate a camera or multimedia player by using the second button unit 33a.

Also, the controlling unit 70 is connected to a sensor unit 71 so as to receive signals from the first sensor unit 71a and a second sensor unit 71b. The controlling unit 70 detects positions of the first panel 10 and the second panel 20 through the sensor unit 71 so as to control (e.g., enable or disable) the first button unit 32a, the second button unit 33a, the digital camera 40, the first and second display units 51 and 52, and the like.

The controlling unit 70 is connected to an audio output unit 60 so as to control audio (sound) output. The controlling unit 70 may also control the first and second display units 51 and 52 for displaying images or text.

Figure 3:
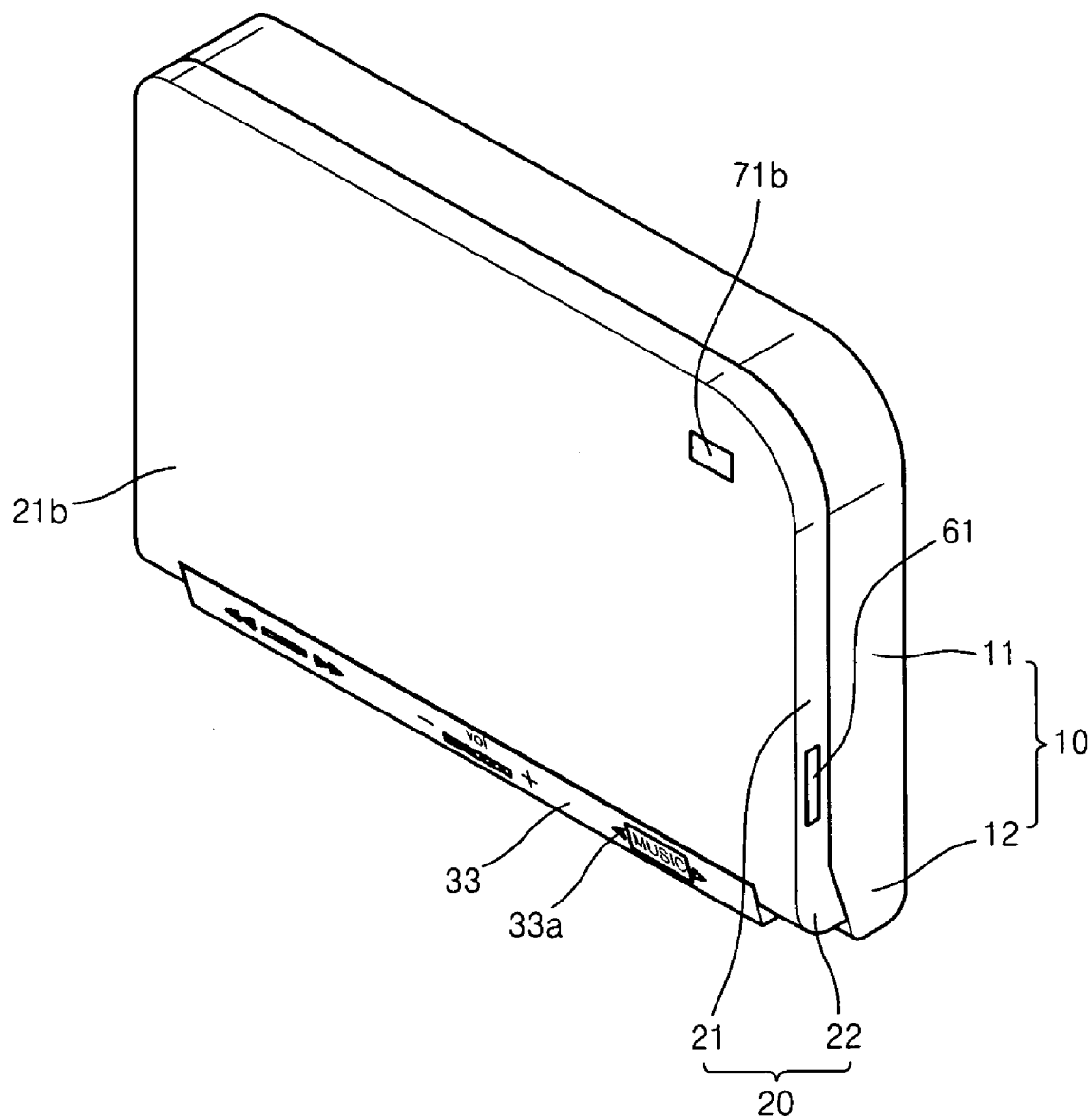
FIG. 3 is a perspective view of the portable information terminal of FIG. 1 oriented in a first position.
Figure 4:
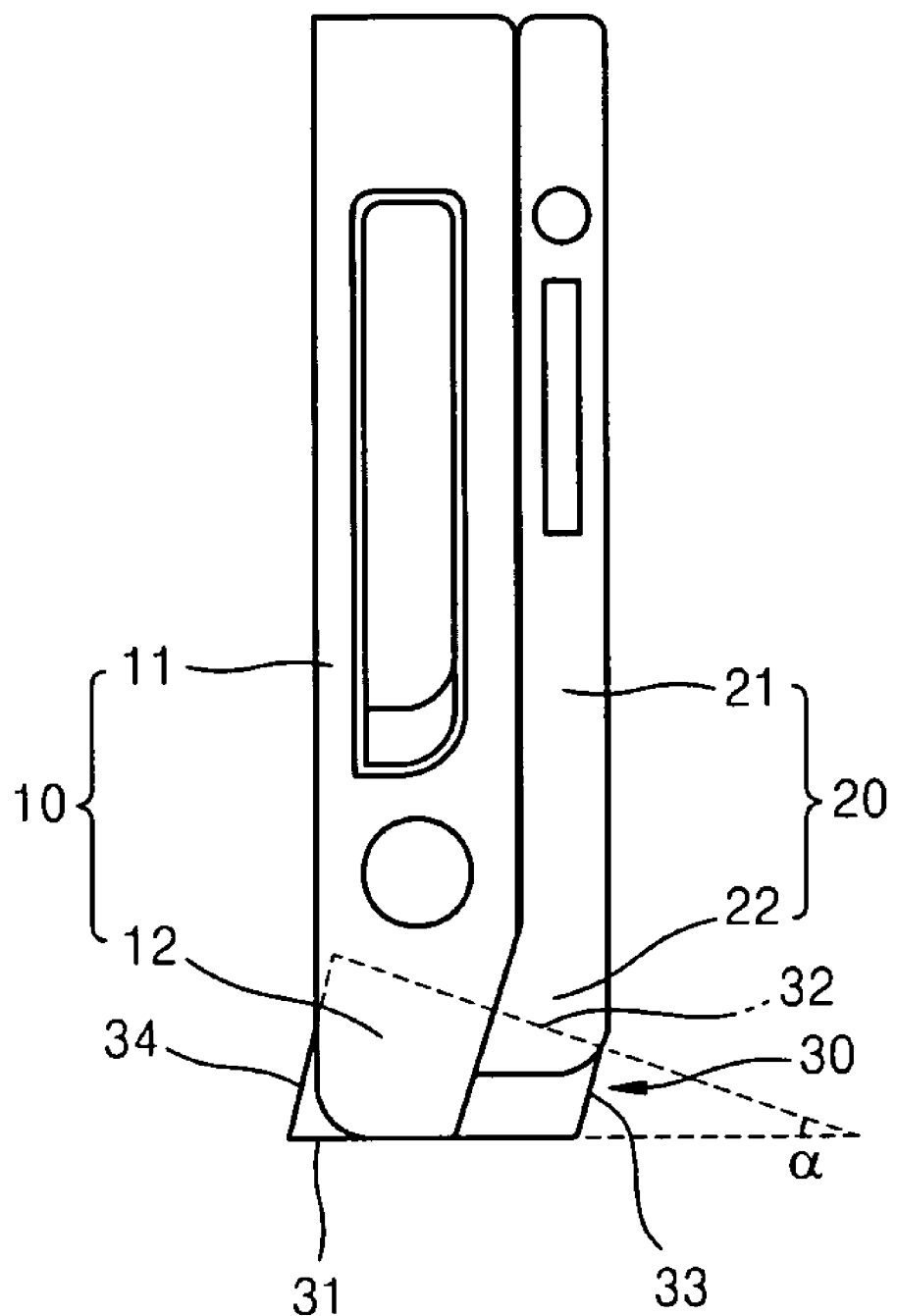
FIG. 4 is a side view of the portable information terminal of FIG. 3.
Figure 5:
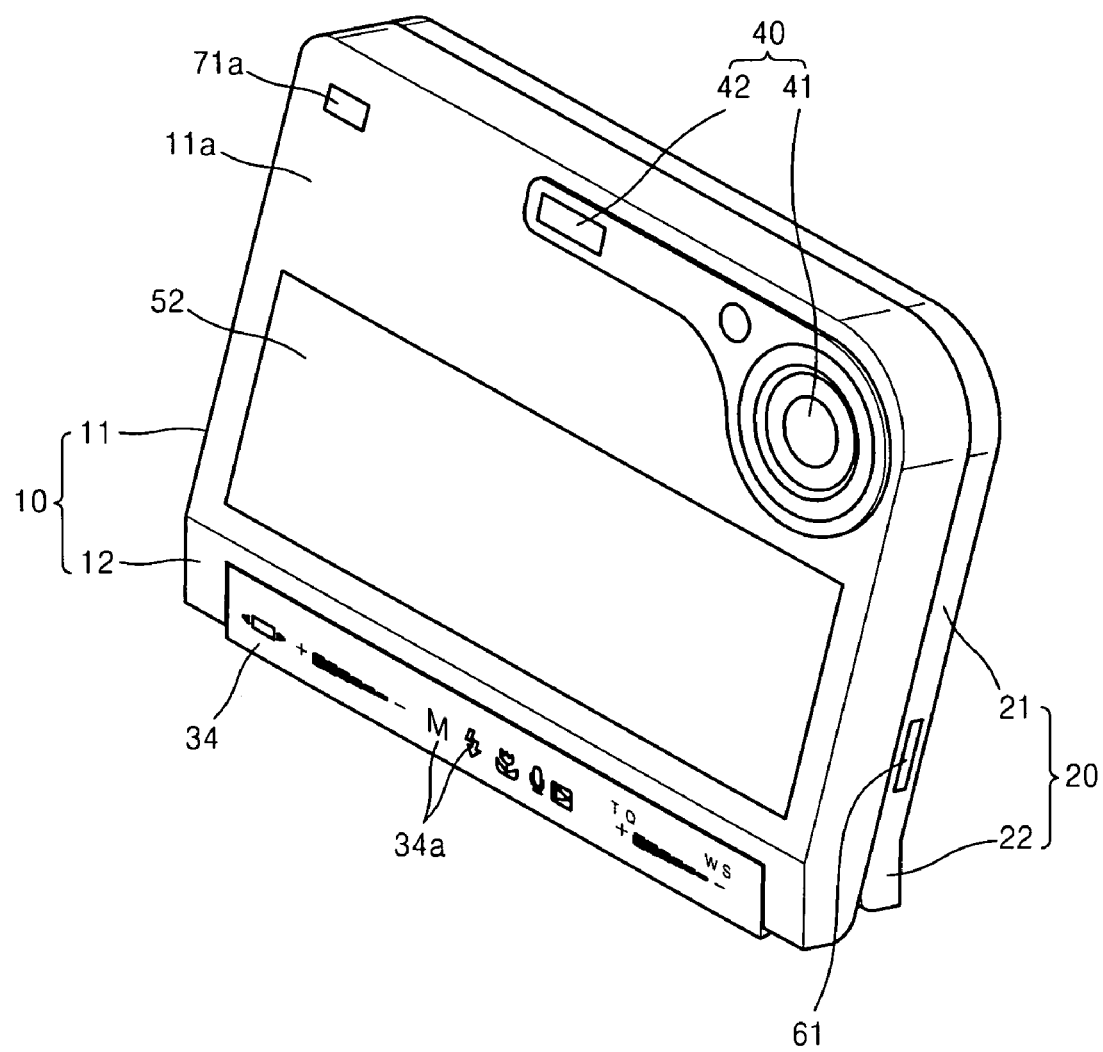
FIG. 5 is a perspective view of the portable information terminal of FIG. 1 oriented in a second position.
Figure 6:
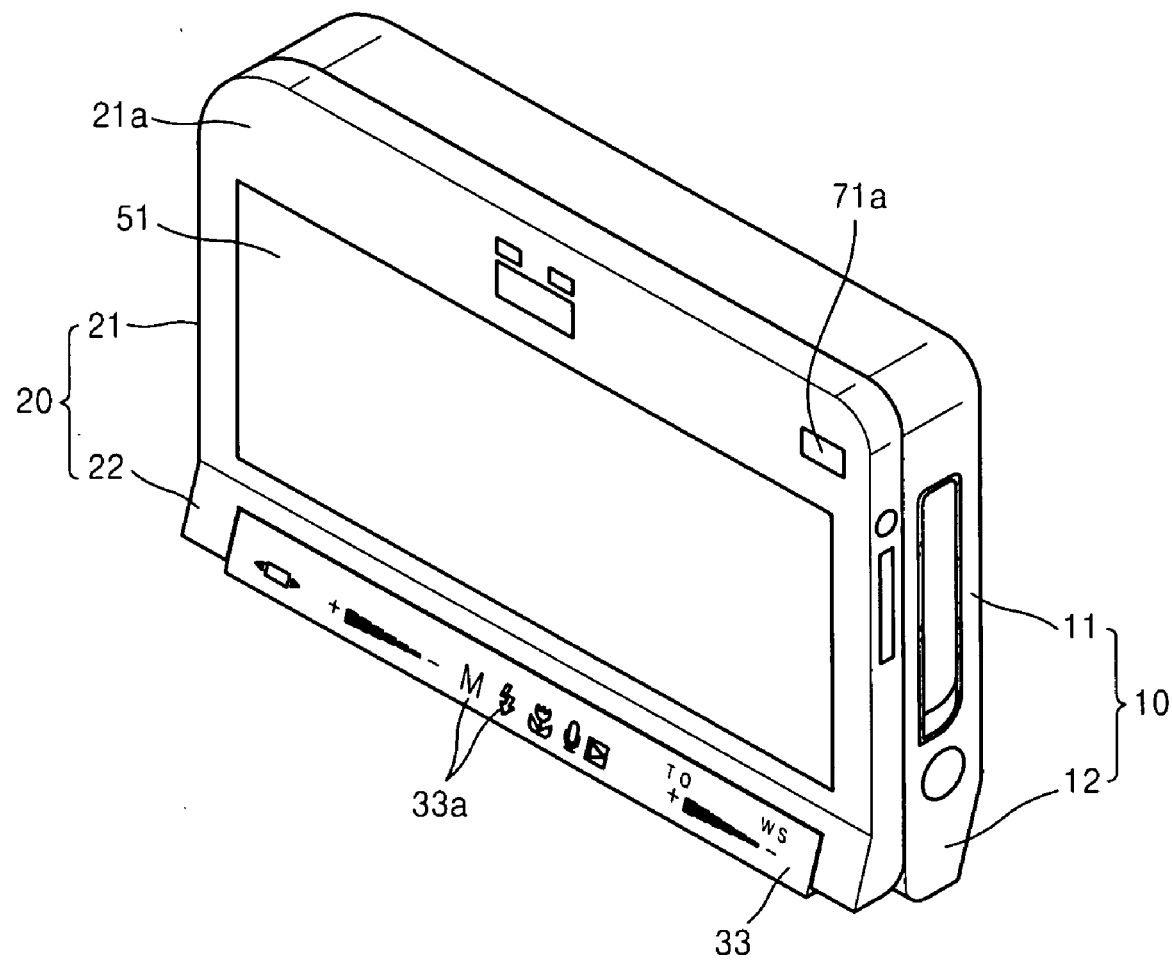
FIG. 6 is a perspective view of the opposite side of the portable information terminal of FIG. 5.
Figure 7:
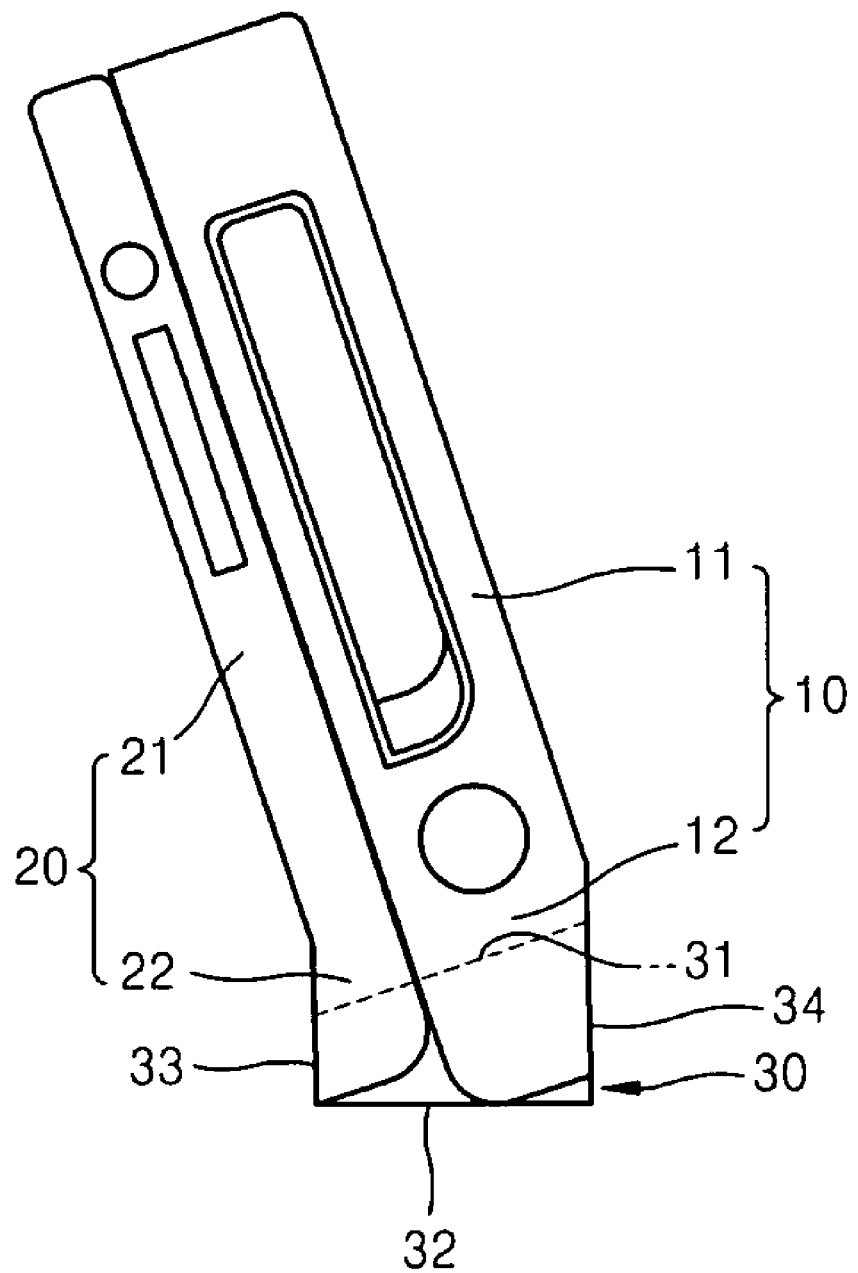
FIG. 7 is a side view of the portable information terminal of FIG. 6.

FIG. 3 is a perspective view of a first position of the portable information terminal of FIG. 1. FIG. 4 is a side view of the portable information terminal of FIG. 3. FIG. 5 is a perspective view of a second position of the portable information terminal of FIG. 1. FIG. 6 is a perspective view of the opposite side of the portable information terminal of FIG. 5. FIG. 7 is a side view of the portable information terminal of FIG. 6.

In FIGS. 3 and 4, the first panel 10 and the second panel 20 are in a first position where the first surface 11a of a first flat board unit 11 and the first surface 21a of a second flat board unit 21 face each other. FIGS. 5 through 7 illustrate a second position where the second surface of the first flat board unit 11 and the second surface of the second flat board unit 21 face each other. Accordingly, the first panel 10 and the second panel 20 can rotate with respect to a connecting unit 30.

When the first panel 10 and the second panel 20 are in the first position as illustrated in FIGS. 3 and 4, a first face 31 of the connecting unit 30 is in contact with an object surface (e.g., a table, etc.), so that the portable information terminal can be supported on the object. In the current embodiment, when the portable information terminal is in the first position, the portable information terminal is designed to function as a multimedia player which replays multimedia such as music files or movie files. To replay movie files, a display apparatus (not shown) may be on the second surface 21b (FIG. 3) of the second panel 20 or the second surface 11b of the first panel 10 that is opposite to the first surface 11a.

When the first panel 10 and the second panel 20 are in the first position, the third face 33 of the connecting unit 30 is exposed to the outside through the second accommodating unit (i.e., the space between the spaced-apart projections defining the second hinge unit 22). Accordingly, the user can operate a second button unit 33a of the portable information terminal in the first position. Furthermore, as shown in FIG. 4, the fourth face 34 of the connecting unit 30 is exposed to the outside through the first accommodating unit (i.e., the space between the spaced-apart projections defining the first hinge unit 12).

As illustrated in FIG. 1, the portable information terminal includes a first sensor unit 71a which detects whether the first panel 10 and the second panel 20 are in the first position or not. If the controlling unit 70 senses that the portable information terminal is in the first position by using the first sensor unit 71a, the controlling unit 70 can activate a multimedia operating button 33c of the second button unit 33a.

The second button unit 33a includes a plurality of push-type buttons (e.g., microswitches, snap domes, etc.) which may include a light-emitting diode (LED). As shown in FIG. 2, some of the buttons of button unit 33a may have a function of the camera operating button 33b and some may have a function of the multimedia operating button 33c. Accordingly, the second button unit 33a receives signals from the controlling unit 70 (relative to the sensor unit 71) so as to activate the camera operating button 33b or the multimedia operating button 33c. The structure of the second button unit 33a is not limited to the above structure, and may be embodied by using different components such as a touch screen-type liquid crystal display.

As illustrated in FIGS. 5 through 7, when the first panel 10 and the second panel 20 are in the second position, the second surface 32 of the connecting unit 30 is in contact with the object surface, so that the portable information terminal can be supported on the object. In the current embodiment, when the portable information terminal is in the second position, the portable information terminal is designed to function as a digital camera.

When the first panel 10 and the second panel 20 are in the first position or in the second position, the second surface 32 may make an acute angle with the first surface 31 (see angle $\alpha$ of FIG. 4) so as to change the angle that is formed when the portable information terminal is stood on the object surface. Accordingly, since the angle of a lens 41 of the digital camera 40 is maintained at a predetermined angle with respect to the object surface, an angle of the digital camera that is appropriate for photographing can be obtained.

A surface of the first hinge unit 12, extending from the first surface 11a of the first flat board unit 11, is inclined downward as shown in FIG. 1 in an inner direction (i.e., toward the connecting unit 30) relative to the first surface 11a of the first flat board unit 11. A surface of the second hinge unit 22, extending from the first surface 21a of the second flat board unit 21, is inclined upward in an inner direction (i.e., toward the connecting unit 30) relative to the first surface 21a of the second flat board unit 21. Since the surface of the first hinge unit 12 and the surface of the second hinge unit 22 are inclined at the same angles, when the first panel 10 and the second panel 20 are in the first position, the first hinge unit 12 and the second hinge unit 22 face each other as is best shown in FIG. 4.

Therefore, when the portable information terminal is in the first position or in the second position, the third face 33 of the connecting unit 30, exposed to the outside through the second accommodating unit 23, does not protrude too much. Accordingly, the portable information terminal looks good in either the first position or the second position, and can also be in an appropriate position so that a user can easily operate the buttons.

Also, since the third face 33 of the connecting unit 30 is exposed to the outside through the second accommodating unit when the first panel 10 and the second panel 20 are in the second position, the user can operate the second button unit 33a of the portable information terminal in the second position.

The portable information terminal may include a second sensor unit 71b which detects whether the first panel 10 and the second panel 20 are in the second position or not (see FIG. 3). If the controlling unit 70 senses that the portable information terminal is in the second position by using the second sensor unit 71b, the controlling unit 70 can activate the camera operating button 33b of the second button unit 33a.

When the user performs a self-photographing function in which the user photographs him or herself by using the digital camera 40, it is desirable for the user to be able to preview him or herself. Thus, the second display unit 52 configured on a surface 11a of the first flat board unit 11 can display live/preview and/or captured images obtained by the digital camera 40.

The connecting unit 30 may further include a third button unit 34a (FIG. 5) on a fourth face 34 exposed to the outside through the first accommodating unit of the first panel 10. The third button unit 34a may include camera operating buttons for operating the digital camera 40. Accordingly, when the user uses the self-photographing function, the user can preview him or herself as shown on the second display unit 52 and take a photograph by operating the third button unit 34a.

Figure 8:
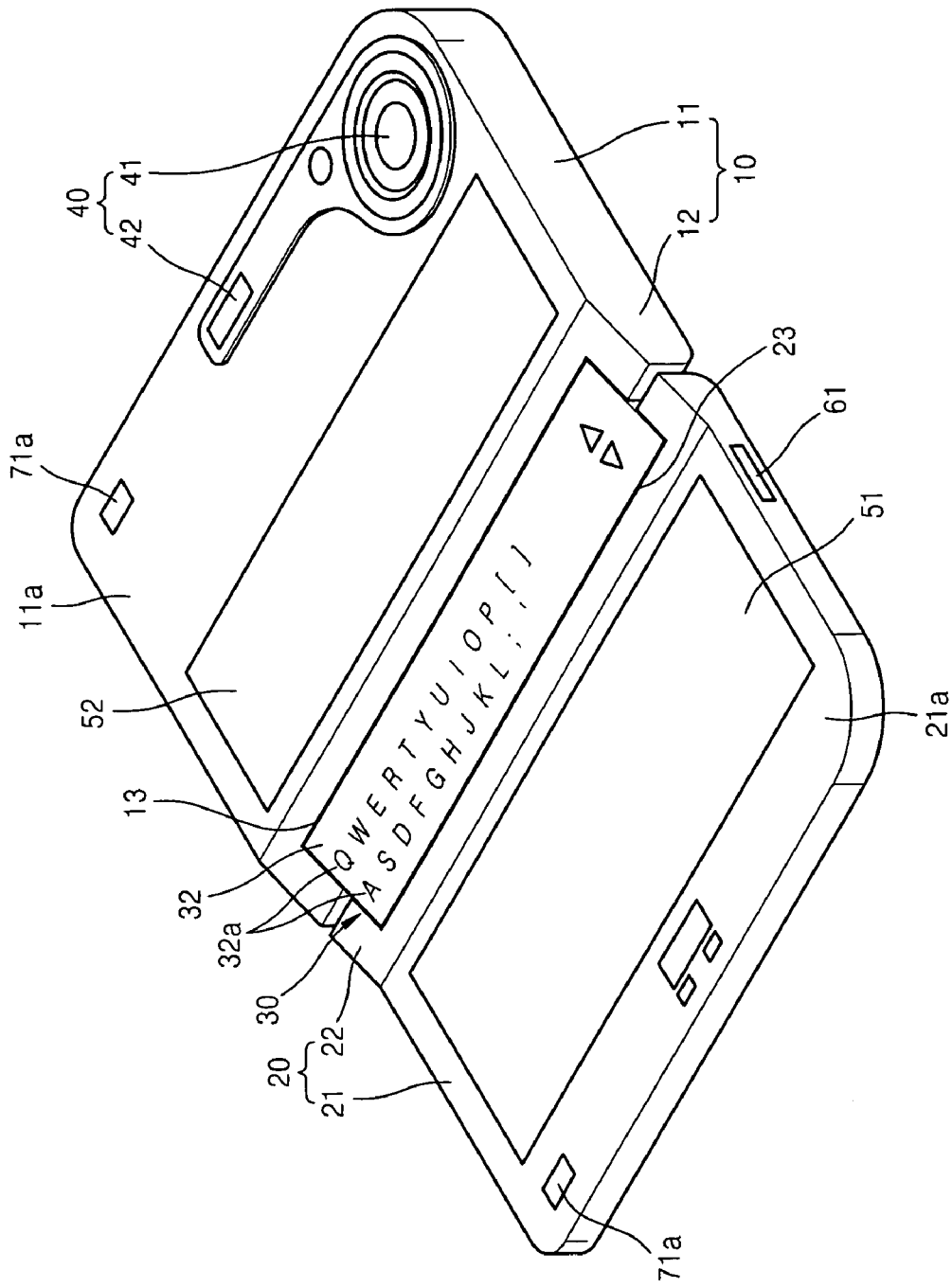
FIG. 8 is a view of the portable information terminal of FIG. 1 oriented in an operating state.

FIG. 8 is an operating state (i.e., unfolded) view of the portable information terminal of FIG. 1.

Referring to FIG. 8, the first panel 10 and the second panel 20 rotate with respect to the connecting unit 30, and thus when the second surface 11b of the first flat board unit 11 opposite the first surface 11a and the second surface 21b of the second flat board unit 21 contact the object surface, a surface of the first hinge unit 12, a surface of the second hinge unit 22, and the second face 32 of the connecting unit 30 are coplanar. Accordingly, an angle between the second face 32 of the connecting unit 30 and the first face 31, an angle between the surface of the first hinge unit 12 and the first surface 11a of the first flat board unit 11, and an angle between the surface of the second hinge unit 22 and the first surface 21b of second flat board unit 21 are set-up substantially the same. Also, the height of the second surface 32 of the connecting unit 30 and a connecting position between the first hinge unit 12 and the second hinge unit 22 with respect to the connecting unit 30 can be designed so that the second face 32 and the first surfaces of the first and second hinge units 12 and 22 are coplanar.

Therefore, when the first panel 10 and the second panel 20 are completely unfolded, the second face 32 of the connecting unit 30 does not protrude, and a surface of the first hinge unit 12 and a surface of the second hinge unit 22 are disposed so as to be on the same plane, and thus, the portable information terminal looks good and a user can easily operate a first button unit 32a.

In FIG. 8, the portable information terminal can display information through first and second display units 51 and 52. For example, when a file including images and text information, such as a web page, is displayed, the first display unit 51 may display the original web page including the images, and the second display unit 52 may display the text of the web page being displayed on the first display unit 51. Accordingly, the user does not need to do unnecessary work, for example, expansion of the web page, in order to view the text information contents while searching the web page, and thus can view the contents in the second display unit 52. Therefore, despite the small size of the portable information terminal, the portable information terminal can effectively provide necessary information to the user by employing the first and second display units 51 and 52 in combination.

Figure 9:
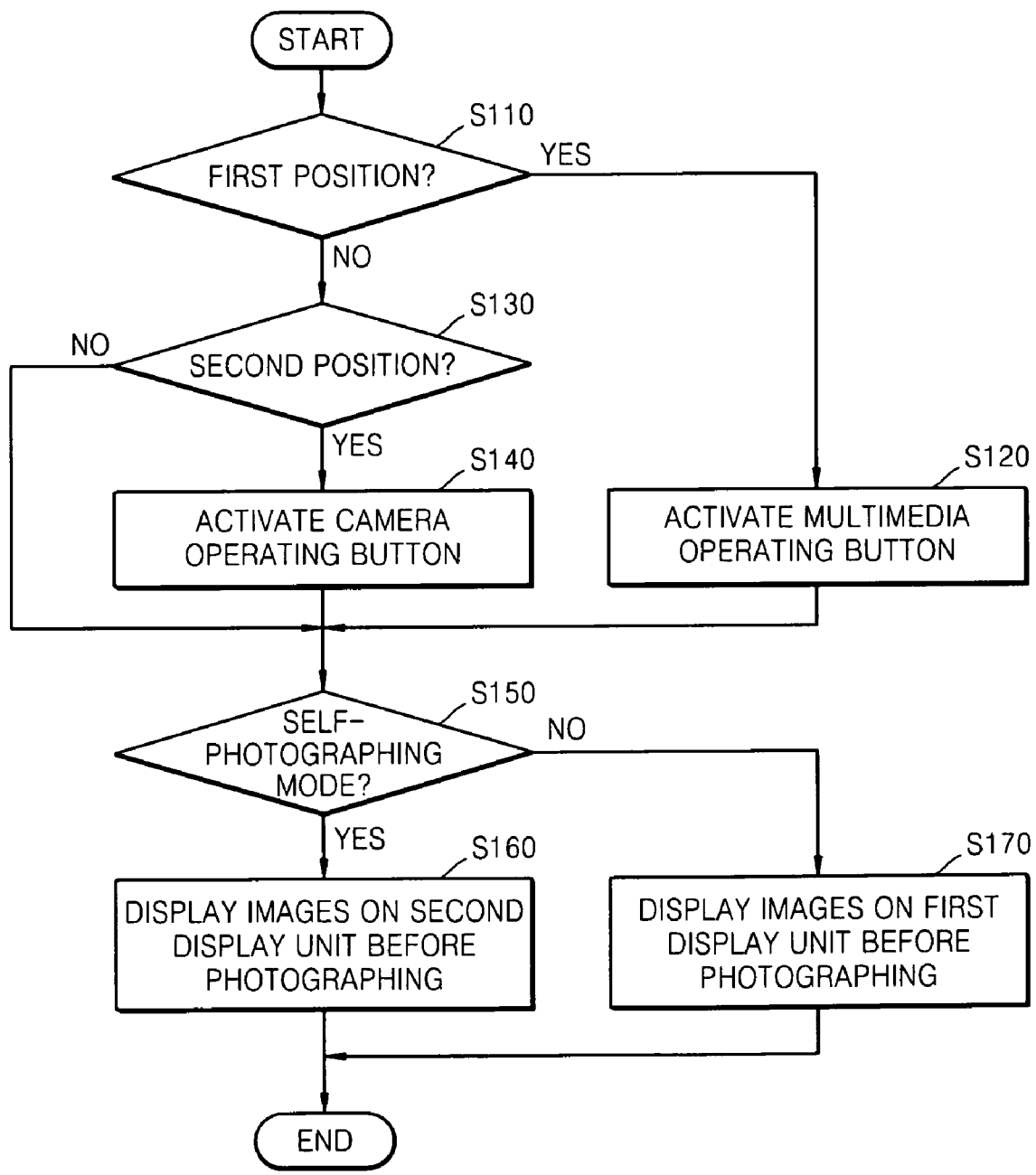
FIG. 9 is a flowchart of an example method of controlling the portable information terminal of FIG. 1.

FIG. 9 is a flowchart of a method of controlling the portable information terminal of FIG. 1.

The controlling unit 70 (FIG. 2) of the portable information terminal determines, relative to the sensor unit 71, whether the first panel and the second panel are in a first position or in a second position, and activates a multimedia operating button or a camera operating button of a second button unit according to the determination result.

In step S110 the portable information terminal judges whether the first and second panels are in the first position according to the detection result of the sensor unit, particularly the first sensor unit. If the portable information terminal judges in step S110 that the first and second panels are in the first position, the portable information terminal activates the multimedia operating button in step S120. If in step S110 the portable information terminal judges that the first and second panels are not in the first position, the portable information terminal then in step S130 judges whether the first and second panels are in a second position. If the portable information terminal in step S130 judges that the first and second panels are in the second position, the information terminal activates the camera operating button in step S140.

When the positions of the first and second panels are in a state in which a digital camera can be used, it is judged in step S150 whether the portable information terminal is set or otherwise being used in a self-photographing mode. The self-photographing mode in which a user photographs him or herself can be set by allowing the user to operate the portable information terminal in order to select the mode, or by allowing a controlling unit to automatically select the mode when the first and second panels are in the second position.

When the self-photographing mode is selected, the portable information terminal displays images on a second display unit before a photograph is taken, so that the second display unit can perform a preview function (S160). The user can perform the self-photographing function while viewing him or herself displayed on the second display unit.

When the self-photographing mode is not selected, the portable information terminal in step S170 displays images on a first display unit before a photograph is taken, so that the first display unit can perform a preview function.

Figure 10:
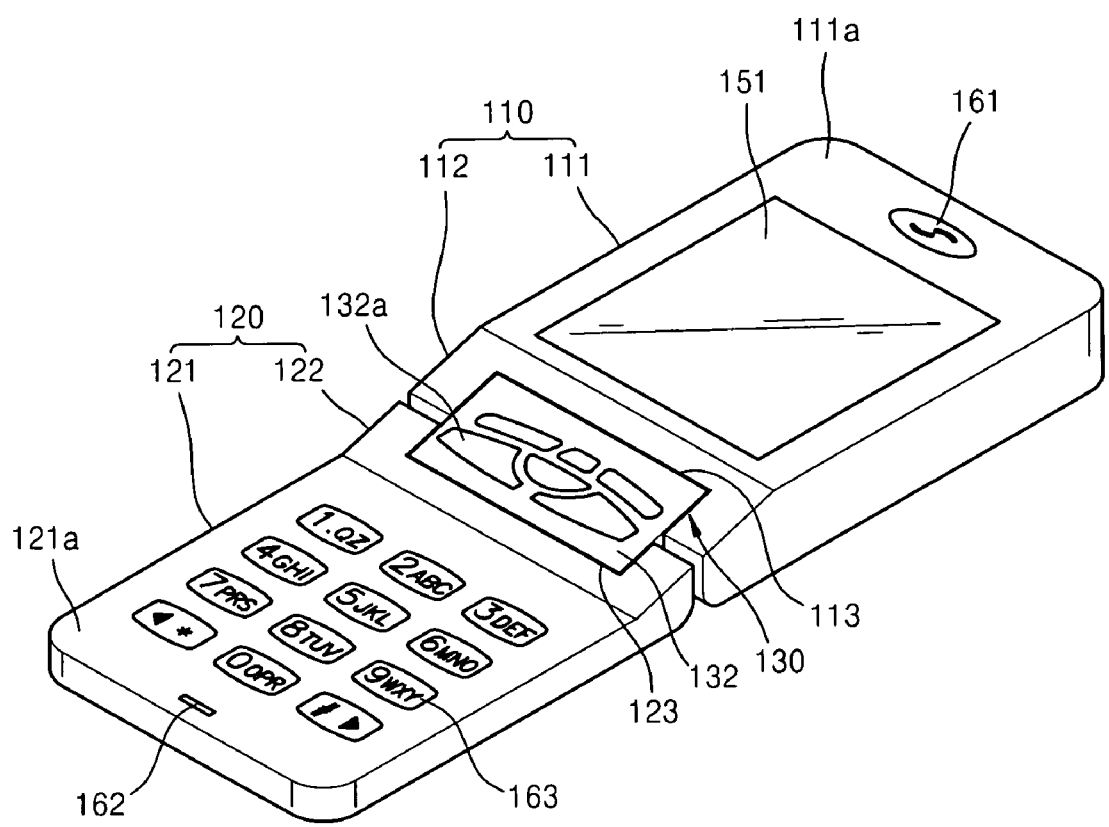
FIG. 10 is a perspective view of a portable information terminal according to another embodiment of the present invention.
Figure 11:
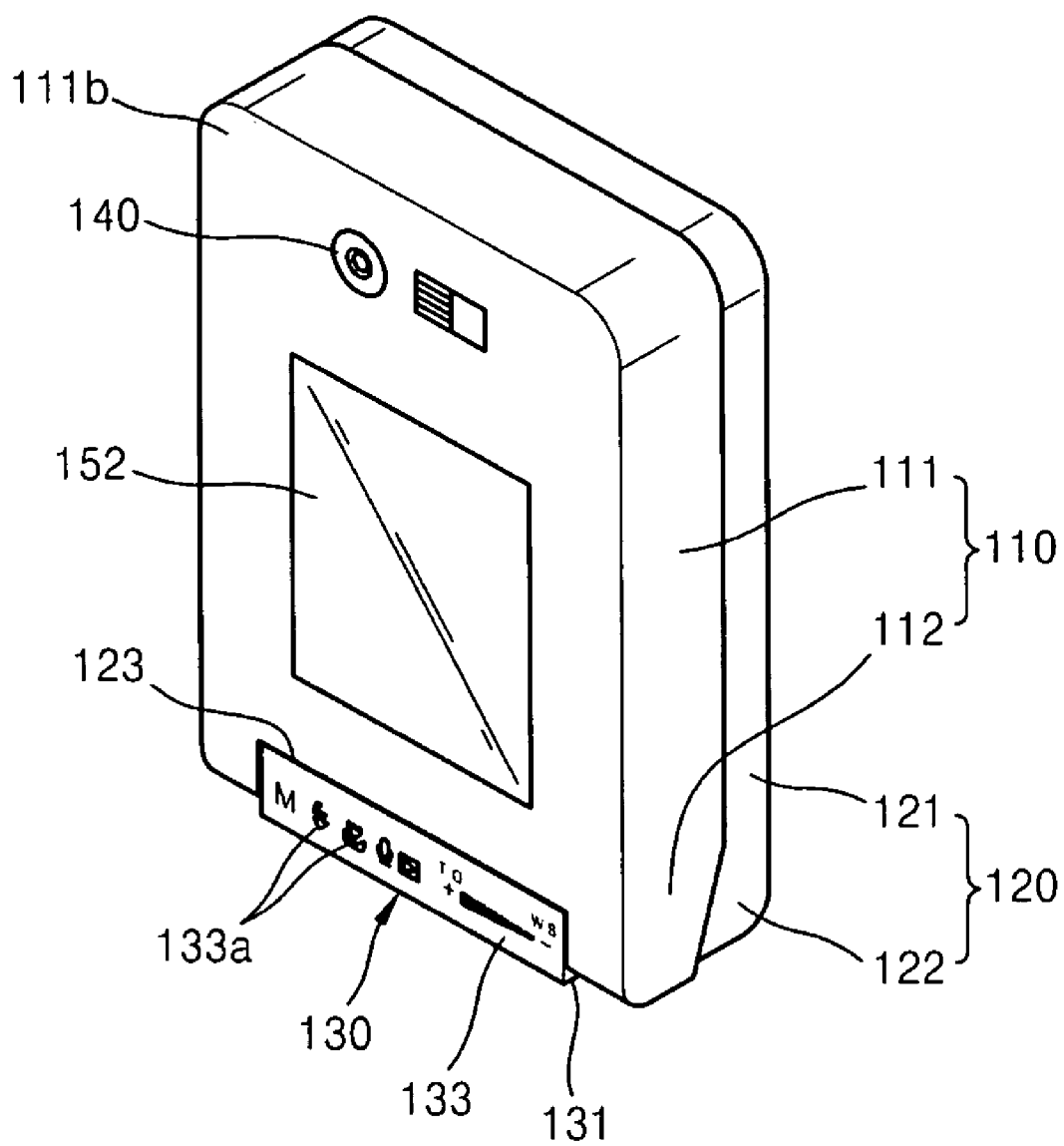
FIG. 11 is a perspective view of the portable information terminal of FIG. 10 oriented in a first position.

FIG. 10 is a perspective view of a portable information terminal according to another embodiment of the present invention. FIG. 11 is a perspective view of a first position of the portable information terminal of FIG. 10.

The portable information terminal according to the embodiment of FIGS. 10 and 11 is embodied by a cellular phone apparatus. The portable information terminal includes a first panel 110, a second panel 120, and a connecting unit 130 connecting the first panel 110 and the second panel 120. The first panel 110 and the second panel 120 are rotatably connected to the connecting unit 130, respectively.

The first panel 110 includes a first flat board unit 111 and a first hinge unit 112. The second panel 120 includes a second flat board unit 121 and a second hinge unit 122. The first flat board unit 111 and the second flat board unit 121 include various electronic apparatuses. The first hinge unit 112 is defined by two spaced-apart projections formed to extend from a lateral surface 113 of the first flat board unit 111. A first accommodating unit is defined by the space between the projections constituting the first hinge unit 112. The second hinge unit 122 is defined by two spaced-apart projections formed to extend from a lateral surface 123 of the second flat board unit 121. A second accommodating unit is defined by the space between the projections constituting the second hinge unit 122.

A portion of the connecting unit 130 is accommodated in the first accommodating unit of the first panel 110 and is rotatably connected to the first hinge unit 112, and the other portion of the connecting unit 130 is accommodated in the second accommodating unit of the second panel 120 and is rotatably connected to the second hinge unit 122.

To embody the cellular phone function, a first display unit 151 and a speaker 161 are configured on a first surface 111a of the first flat board unit 111, and a key pad unit 163 and a microphone 162 are configured on a first surface 121a of the second flat board unit 121. A user can listen to a voice through the speaker 161 and can send his or her voice through the microphone 162. Also, the user can view information displayed on the first display unit 151 by operating the key pad unit 163. Referring to FIG. 11, a digital camera 140 and a second display unit 152 can be configured on the second surface 111b of the first flat board unit 111 that is opposite to the first surface 111a.

When the first panel 110 and the second panel 120 are unfolded with respect to the connecting unit 130 as illustrated in FIG. 10, the user can use the portable information terminal as a cellular phone. When in the unfolded orientation or state, a second face 132 of the connecting unit 130 is exposed to the outside. A first button unit 132a may be configured on the second face 132 of the connecting unit 130 in order to control various functions of the cellular phone.

In a conventional cellular phone, menu buttons occupying much space are disposed on the second panel 120 where the microphone 161 and the key pad unit 163 are configured, so that the design of the key pad unit 163 is limited. However, in the embodiment illustrated in FIG. 10, since the menu buttons are disposed on the second face 132 of the connecting unit 130, the degree of freedom of the design can be increased in conjunction with the disposition of the key pad unit 163.

When the portable information terminal is positioned as illustrated in FIG. 10, the portable information terminal can function as a camera in addition to the cellular phone function. Images captured by the digital camera 140 may be displayed on the first display unit 151. Furthermore, the user may operate the camera function by using the key pad unit 163 and/or the buttons disposed on the second face 132 of the connecting unit 130. Accordingly, one or more camera operating buttons (e.g., a shutter release button, a flash button, a zoom/telephoto button, etc.) may be configured on the second face 132 of the connecting unit 130.

Since the first panel 110 and the second panel 120 can rotate with respect to the connecting unit 130, the first panel 110 and the second panel 120 can be oriented in a first position in which the first surface 111a of the first panel 110 and the first surface 121a of the second panel 120 face each other. When the first and second panels 110 and 120 are in the first position as illustrated in FIG. 11, a first face 131 of the connecting unit 130 is in contact with an object surface so that the portable information terminal can be supported on the object. In the current embodiment, the portable information terminal is designed so as to function as a digital camera when the portable information terminal is in the first position. However, the portable information terminal may also function as a speakerphone or as a multimedia player when oriented in the first position.

When the first and second panels 110 and 120 are in the first position, a third face 133 of the connecting unit 130 is exposed to the outside through the second accommodating unit. Also, the digital camera 140 and the second display unit 152 are exposed to the outside in the first position. Accordingly, the user can operate a second button unit 133a of the portable information terminal in the first position. The camera operating button of the second button unit 133a can be activated for using the digital camera 140 when the portable information terminal is oriented in the first position.

When the portable information terminal is in the first position, the second display unit 152 may display images captured by the digital camera 140, so that the portable information terminal may be used with a preview function, in which a user views him or herself through the second display unit 152, so that the user may be provided with a self-photographing function. Similar to the embodiment illustrated in FIG. 6, an acute angle is defined between the first surface 131 and the second surface 132 of the connecting unit 130, and angles of the first hinge unit 112 and the second hinge unit 122 is set by the angle between the first face 131 and the second face 132, so that the portable information terminal is maintained at an appropriate angle and can be supported on the bottom surface.

Furthermore, the portable information terminal can be changed to a second position in which the second surface 111b of the first flat board unit 111 and the second surface of the second flat board unit 121 face each other. When the first and second panels 110 and 120 are in the second position, the second face 132 of the connecting unit 130 is in contact with an object surface, so that the portable information terminal can be supported on the object.

In the current embodiment, when the portable information terminal is in the second position, the portable information terminal may be designed so as to function as a multimedia reproducing apparatus. That is, since the first display unit 151 of the first flat board unit 111 is exposed to the outside when the portable information terminal is in the second position, the user can replay movie files through the first display unit 151 or use an MPEG audio layer-3 (MP3) function to replay music files by operating a menu through the first display unit 151 or the key pad unit 163.

When the first and second panels 110 and 120 are in the second position, the third face 133 of the connecting unit 130 is exposed to the outside through the second accommodating unit. Accordingly, the user can operate the second button unit 133a of the portable information terminal in the second position. The second button unit 133a can activate the camera operating button used to operate the digital camera 140.

If a two-way display apparatus such as a touch screen is used as the first display unit 151, a tablet function, in which memos or pictures can be freely inputted to the portable information terminal when in the first position, can be realized.

According to a portable information terminal of the present invention, a first panel and a second panel are rotatably connected to a connecting unit, respectively, so that panels including a display unit can freely rotate to various angles, and accordingly, the portable information terminal is easy to use.

Also, in the portable information terminal of the present invention, a button unit is configured on one or more surfaces of the connecting unit, and buttons are exposed to the outside through an accommodating unit of a panel even when the panels are operated in a folded state, and accordingly, the buttons of the portable information terminal can be operated in a folded state.

Also, in the portable information terminal of the present invention, the portable information terminal can be supported on a surface when a first panel and a second panel face each other and are folded, without using a separate stand or rest.

Also, in the portable information terminal of the present invention, a first display unit and a second display unit are connected to each other, so that the portable information terminal displays information, and accordingly, a user can easily view files including images and text.

Also, in the portable information terminal of the present invention, a user can preview him or herself when using a self-photographing function in which the user photographs him or herself by using a camera.

While the present invention has been particularly shown and described with reference to example embodiments thereof, it will be understood by one of ordinary skill in the art that various changes in form and details may be made therein without departing from the spirit and scope of the present invention as defined by the following claims.

What is claimed is:

1. A portable information terminal comprising:
a first panel which comprises a first flat board unit having a first accommodating unit that is formed by removing a part of an edge of the first flat board unit, and a first hinge unit that is formed on a lateral surface of the first accommodating unit;
a connecting unit having a quadrangle-shaped cross section, a first portion of the connecting unit configured to be accommodated in the first accommodating unit so as to be rotatably connected to the first hinge unit; and
a second panel which comprises a second flat board unit having a second accommodating unit that is formed by removing a part of an edge of the second flat board unit so as to accommodate a second portion of the connecting unit, and a second hinge unit that is formed on a lateral surface of the second accommodating unit so as to be rotatably connected to the second portion of the connecting unit;
the first and second panels being rotatable with respect to the connecting unit between a first position and a second position, the first position being when first surfaces of the first and second flat board units face each other and are substantially parallel with each other, and the second position being when second surfaces of the first and second flat board units face each other and are substantially parallel with each other, the first surfaces being opposite to the second surfaces; and
the connecting unit further comprising:
a first face which is configured to contact an object surface when the first and second panels are in the first position so that the portable information terminal can be supported on the object surface;
a second face which is an opposite surface to the first face, the second face configured to contact with the object surface when the first and second panels are in the second position so that the portable information terminal can be supported on the object surface; and
a first button unit on the second face that is exposed to the outside when the first and second panels are in the second position, but not externally exposed when the first and second panels are in the first position.

2. The portable information terminal of claim 1, wherein an intersection of planes coplanar with the first and second faces makes an acute angle.

3. The portable information terminal of claim 1, the first button unit being configured for inputting text.

4. The portable information terminal of claim 2, wherein the first hinge unit extends downward at a first angle relative to the first surface of the first flat board unit, and the second hinge unit extends upward at a second angle relative to the first surface of the second flat board, the first and second angles being complementary so that the first hinge unit and the second hinge unit face each other when the first and second panels are in the first position.

5. The portable information terminal of claim 4, wherein surfaces of the first and second hinge units are coplanar with the second surface of the connecting unit when second surfaces of the first and second flat board units contact an object surface.

6. The portable information terminal of claim 1, wherein the connecting unit comprises a second button unit on a third face, the second button unit being exposed to the outside through the second accommodating unit when the first and second panels are in the first position or in the second position.

7. The portable information terminal of claim 6, further comprising:
a digital camera on the first surface of the first flat board unit;
a first display unit on the first surface of the second flat board unit; and
an audio output unit for outputting an audio signal.

8. The portable information terminal of claim 7, further comprising a sensor unit for detecting whether the first and second panels are in the first position or in the second position,
and wherein the second button unit comprises camera operating buttons for operating the digital camera, and multimedia operating buttons for operating a multimedia player,
wherein the second button unit activates the camera operating buttons when the first and second panels are in the first position, and wherein the second button unit activates the multimedia operating buttons when the first and second panels are in the second position.

9. The portable information terminal of claim 7, further comprising a second display unit on the first surface of the first flat board unit, wherein the first display unit displays a web page, and the second display unit displays text information of the web page being displayed in the first display.

10. The portable information terminal of claim 7, further comprising a second display unit on the first surface of the first flat board unit for displaying a preview image of a user of the portable information terminal to facilitate self-photographing.

11. The portable information terminal of claim 6, wherein the connecting unit comprises a third button unit on a fourth face, the third button unit being exposed to the outside through the first accommodating unit when the first and second panels are in the first position or in the second position.

12. The portable information terminal of claim 6, further comprising:
a first display unit and a speaker on the first surface of the first flat board unit; and
a key pad unit and a microphone on the first surface of the second flat board unit.

13. The portable information terminal of claim 2, further comprising a camera and a second display unit on the second surface of the first flat board unit.

14. The portable information terminal of claim 1 wherein the connecting unit has a frusto-triangular prism shape.

15. The portable information terminal of claim 14 wherein the frusto-triangular prism shape has a frusto-isosceles triangular cross section.

16. The portable information terminal of claim 14 wherein the frusto-triangular prism shape has parallel end surfaces proximate the first and second hinge units, the parallel end surfaces including first and second sets of pivot bosses that define respective first and second pivot axes, wherein the first panel is hingably coupled with the connecting unit by the first set of pivot bosses for rotation about the first pivot axis, and wherein the second panel is hingably coupled with the connecting unit by the second set of pivot bosses for rotation about the second pivot axis.

17. A portable information terminal comprising:
a first panel which comprises a first flat board unit including a first accommodating unit having a first inner edge that is formed by removing a middle part of an inner side portion of the first flat board unit, and a first hinge unit comprising a plurality of spaced-apart projections that extend along lateral sides of the first accommodating unit from the first inner edge;

a connecting unit having a quadrangle-shaped cross section, a first portion of the connecting unit configured to be accommodated in the first accommodating unit so as to be rotatably connected to the first hinge unit; and a second panel which comprises a second flat board unit including a second accommodating unit having a second inner edge that is formed by removing a middle part of an inner side portion of the second flat board unit so as to accommodate a second portion of the connecting unit, and a second hinge unit comprising a plurality of spaced-apart projections that extend along lateral sides of the second accommodating unit from the second inner edge toward the connecting unit so as to be rotatably connected to the second portion of the connecting unit;

the first and second panels being rotatable with respect to the connecting unit between a first position and a second position, the first position being when first surfaces of the first and second flat board units face each other and are substantially parallel and proximate to each other, and the second position being when second surfaces of the first and second flat board units face each other and are substantially parallel and proximate to each other, the first surfaces being opposite to the second surfaces; and the connecting unit further comprising:
- a first face which is configured to contact an object surface when the first and second panels are in the first position so that the portable information terminal can be supported on the object surface;
- a second face which is an opposite surface to the first face, the second face configured to contact with the object surface when the first and second panels are in the second position so that the portable information terminal can be supported on the object surface;
- a button unit on one face that is exposed to the outside when the first and second panels are in one of the first or second position, but not externally exposed when the first and second panels are in the other of the first or second position; and
- another button unit on a different face that is exposed to the outside when the first and second panels are in the first position and the second position.

18. The portable information terminal of claim 17, wherein a thickness of the first panel and the second panel differ, a thickness of the first portion of the connecting unit being substantially equal to the thickness of the first panel, a thickness of the second portion of the connecting unit being substantially equal to the thickness of the second panel, and an intersection of planes coplanar with the first and second faces makes an acute angle.

19. The portable information terminal of claim 18, wherein when the first and second panels are rotated in a third position in which the second surfaces of each of the first and second flat board units lie flat in a same plane as a face of the connecting unit, the second face of the connecting unit rises from a level of the second hinge unit to a level of the first hinge unit.

20. The portable information terminal of claim 18, wherein surfaces of the first and second hinge units are coplanar with the second face of the connecting unit when second surfaces of the first and second flat board units contact an object surface.

* * * * *